United States Patent
Nomoto et al.

(10) Patent No.: US 10,422,812 B2
(45) Date of Patent: Sep. 24, 2019

(54) DIAGNOSTIC METHOD, INFORMATION PROCESSING DEVICE, AND STORAGE MEDIUM

(71) Applicant: Fujitsu Client Computing Limited, Kanagawa (JP)

(72) Inventors: Ryo Nomoto, Hachioji (JP); Takaaki Cho, Yokohama (JP)

(73) Assignee: Fujitsu Client Computing Limited, Kanagawa (JP)

( * ) Notice: Subject to any disclaimer, the term of this patent is extended or adjusted under 35 U.S.C. 154(b) by 194 days.

(21) Appl. No.: 15/183,920

(22) Filed: Jun. 16, 2016

(65) Prior Publication Data

US 2017/0024300 A1 Jan. 26, 2017

(30) Foreign Application Priority Data

Jul. 22, 2015 (JP) .................. 2015-145159

(51) Int. Cl.
| | | |
|---|---|---|
| *G06F 11/30* | (2006.01) | |
| *G21C 17/00* | (2006.01) | |
| *G01P 15/18* | (2013.01) | |
| *G06F 11/273* | (2006.01) | |
| *G01P 15/08* | (2006.01) | |

(52) U.S. Cl.
CPC .......... *G01P 15/18* (2013.01); *G01P 15/0891* (2013.01); *G06F 11/273* (2013.01)

(58) Field of Classification Search
CPC ..... G06F 11/273; G01P 15/0891; G01P 15/18
USPC ....................................... 702/183
See application file for complete search history.

(56) References Cited

U.S. PATENT DOCUMENTS 5,928,300 A * 7/1999 Rogers ................ B60R 21/0132
 180/268
6,453,266 B1 * 9/2002 Chainer ................ G06F 1/1613
 340/506

(Continued)

FOREIGN PATENT DOCUMENTS

| JP | 2002-247153 A | 8/2002 |
|---|---|---|
| JP | 2004-228976 A | 8/2004 |

(Continued)

*Primary Examiner* — Michael P Nghiem
(74) *Attorney, Agent, or Firm* — Osha Liang LLP

(57) ABSTRACT

A diagnostic method executed by a processor included in an information processing device, the information processing device including an acceleration sensor and a plurality of devices and having a function of executing a diagnosis of each of the plurality of devices, the diagnostic method includes storing threshold information that is set regarding each of the plurality of devices and includes a plurality of directions and thresholds of acceleration components each corresponding to a respective one of the plurality of directions; receiving acceleration information from the acceleration sensor; calculating acceleration components each corresponding to the respective one of the plurality of directions by using the acceleration information when shock is detected from the acceleration information; extracting one or more devices having a possibility of a breakdown from the plurality of devices by comparing the acceleration components and the threshold information; and executing a diagnosis regarding the one or more devices.

10 Claims, 14 Drawing Sheets

(56) References Cited

U.S. PATENT DOCUMENTS

| | | | | |
|---|---|---|---|---|
| 2008/0125701 A1* | 5/2008 | Moberg | ................ | A61B 5/1118 604/67 |
| 2008/0129518 A1* | 6/2008 | Carlton-Foss | ........ | A61B 5/1117 340/573.1 |
| 2008/0224879 A1* | 9/2008 | Zadesky | ................ | G01P 15/06 340/653 |
| 2009/0287449 A1* | 11/2009 | Nagashima | ......... | G01P 15/0891 702/141 |
| 2013/0090881 A1* | 4/2013 | Janardhanan | ........ | G01C 22/006 702/104 |
| 2014/0285333 A1* | 9/2014 | Imamura | ............. | B60L 11/1851 340/436 |
| 2015/0097961 A1* | 4/2015 | Ure | ........................ | G08B 5/223 348/159 |
| 2016/0003863 A1* | 1/2016 | Chau | ....................... | G01P 15/18 73/152.46 |

FOREIGN PATENT DOCUMENTS

| | | |
|---|---|---|
| JP | 2005-30937 A | 2/2005 |
| JP | 2006-254207 A | 9/2006 |
| JP | 2008-250391 A | 10/2008 |

* cited by examiner

FIG. 4
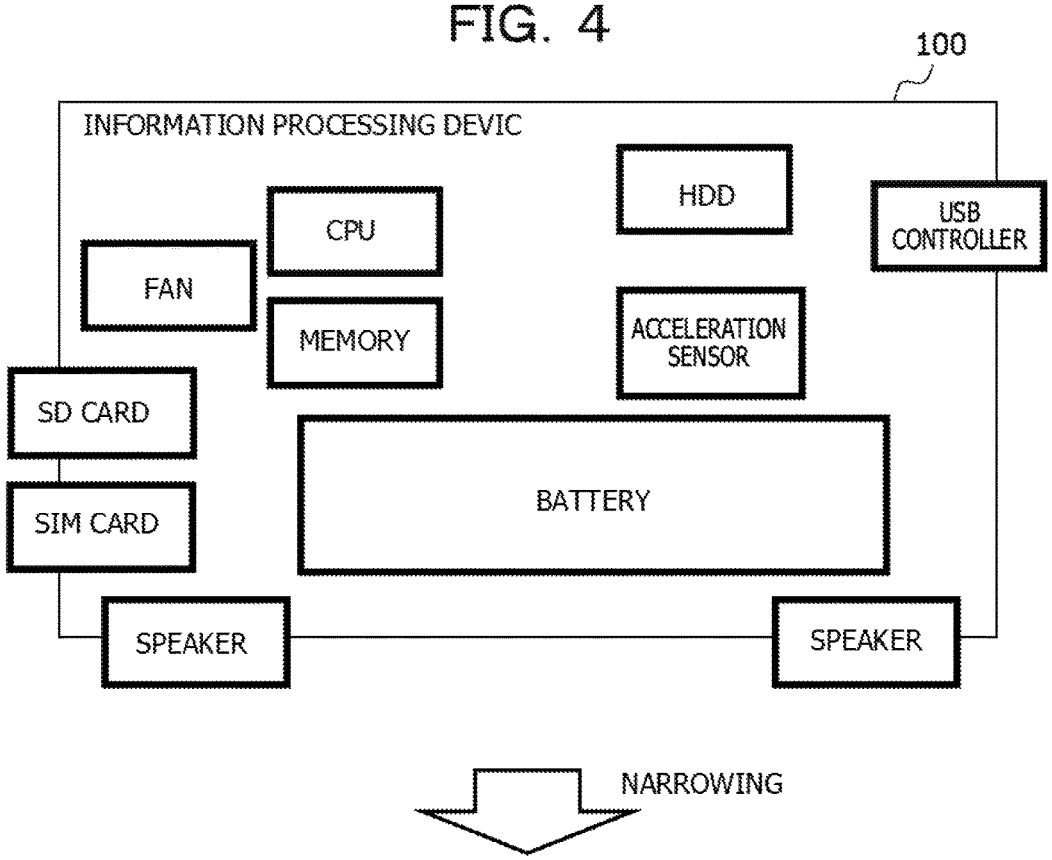
NARROWING
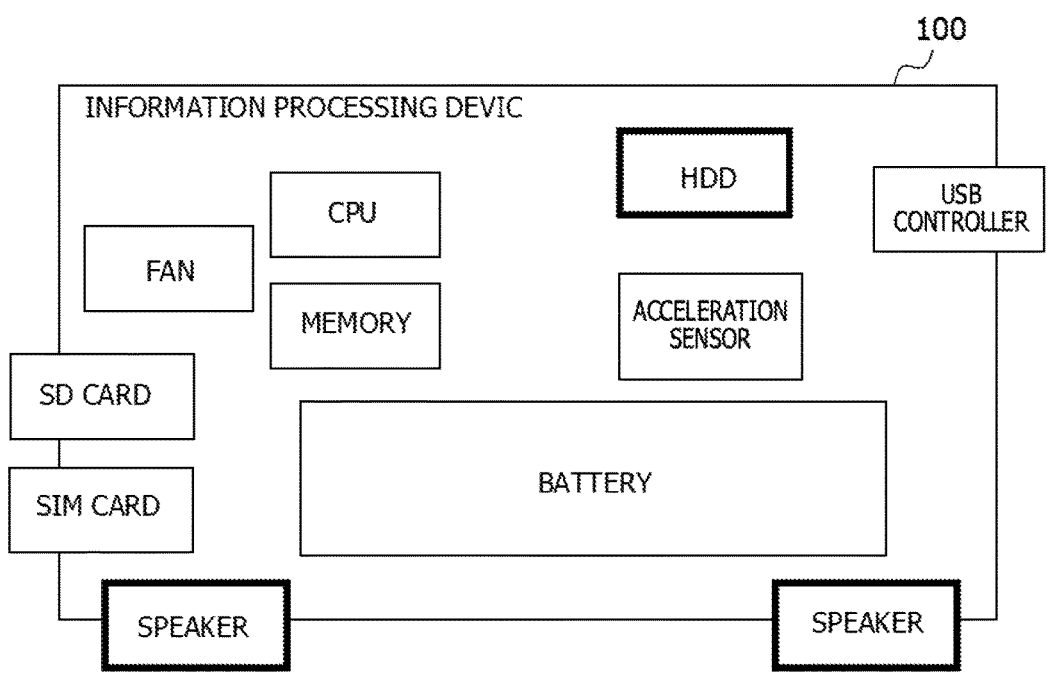

FIG. 6

| FALL DIRECTION | BATTERY | HDD | SPEAKER | ... |
|---|---|---|---|---|
| ⋮ | ⋮ | ⋮ | ⋮ | ... |
| -X DIRECTION | 5.00 | 2.50 | 3.11 | ... |
| -Y DIRECTION | 5.00 | 2.50 | 3.11 | ... |
| ⋮ | ⋮ | ⋮ | ⋮ | ... |
| -X-Y DIRECTION | 2.82 | 3.54 | 2.20 | ... |
| ⋮ | ⋮ | ⋮ | ⋮ | ... |

(UNIT:G)

FIG. 10

| UNIT VECTOR OF FALL DIRECTION (x,y,z) | BATTERY | TOUCH PANEL AND LIQUID CRYSTAL DISPLAY | SIM CARD | ... |
|---|---|---|---|---|
| (1,0,0) | 1.71 | 1.71 | 1.71 | ... |
| (-1,0,0) | 2.10 | 2.50 | 2.50 | ... |
| (0,1,0) | 1.68 | 1.68 | 1.68 | ... |
| (0,-1,0) | 1.67 | 1.83 | 1.83 | ... |
| (0,0,1) | 1.65 | 1.65 | 1.65 | ... |
| (0,0,-1) | 1.66 | 1.66 | 1.66 | ... |
| (0.71,0.71,0) | 1.29 | 1.29 | 1.29 | ... |
| (0.71,-0.71,0) | 1.27 | 1.27 | 1.27 | ... |
| (-0.71,0.71,0) | 1.27 | 1.27 | 1.27 | ... |
| (-0.71,-0.71,0) | 2.60 | 3.06 | 3.06 | ... |
| (0.71,0,0.71) | 1.25 | 1.25 | 1.25 | ... |
| (0.71,0,-0.71) | 1.27 | 1.27 | 1.27 | ... |
| (-0.71,0,0.71) | 2.12 | 1.98 | 2.12 | ... |
| (-0.71,0,-0.71) | 1.26 | 1.26 | 1.26 | ... |
| (0,0.71,0.71) | 1.17 | 1.17 | 1.17 | ... |
| (0,0.71,-0.71) | 1.26 | 1.26 | 1.26 | ... |
| (0,-0.71,0.71) | 2.49 | 2.45 | 2.49 | ... |
| (0,-0.71,-0.71) | 1.18 | 1.18 | 1.18 | ... |
| (0.58,0.58,0.58) | 1.03 | 1.03 | 1.03 | ... |
| (-0.58,0.58,0.58) | 1.12 | 1.09 | 1.12 | ... |
| (0.58,-0.58,0.58) | 1.10 | 1.10 | 1.10 | ... |
| (0.58,0.58,-0.58) | 1.08 | 1.08 | 1.08 | ... |
| (-0.58,-0.58,0.58) | 2.94 | 3.06 | 3.06 | ... |
| (0.58,-0.58,-0.58) | 1.10 | 1.10 | 1.10 | ... |
| (-0.58,0.58,-0.58) | 1.11 | 1.11 | 1.11 | ... |
| (-0.58,-0.58,-0.58) | 1.30 | 1.94 | 1.94 | ... |

(UNIT:G)

FIG. 11

| UNIT VECTOR OF FALL DIRECTION (x,y,z) | SHOCK VALUE |
|---|---|
| (1,0,0) | -2.00 |
| (-1,0,0) | 2.00 |
| (0,1,0) | -1.78 |
| (0,-1,0) | 1.78 |
| (0,0,1) | 0.92 |
| (0,0,-1) | -0.92 |
| (0.71,0.71,0) | -2.67 |
| (0.71,-0.71,0) | -0.16 |
| (-0.71,0.71,0) | 0.16 |
| (-0.71,-0.71,0) | 2.67 |
| (0.71,0,0.71) | -0.61 |
| (0.71,0,-0.71) | -1.91 |
| (-0.71,0,0.71) | 1.91 |
| (-0.71,0,-0.71) | 0.61 |
| (0,0.71,0.71) | -0.76 |
| (0,0.71,-0.71) | -2.06 |
| (0,-0.71,0.71) | 2.06 |
| (0,-0.71,-0.71) | 0.76 |
| (0.58,0.58,0.58) | -1.65 |
| (-0.58,0.58,0.58) | 0.66 |
| (0.58,-0.58,0.58) | 0.40 |
| (0.58,0.58,-0.58) | -2.71 |
| (-0.58,-0.58,0.58) | 2.71 |
| (0.58,-0.58,-0.58) | -0.66 |
| (-0.58,0.58,-0.58) | -0.40 |
| (-0.58,-0.58,-0.58) | 1.65 |

(UNIT:G)

FIG. 12

| UNIT VECTOR OF FALL DIRECTION (x,y,z) | BATTERY | TOUCH PANEL AND LIQUID CRYSTAL DISPLAY | SIM CARD | SHOCK VALUE |
|---|---|---|---|---|
| (1,0,0) | 1.71 | 1.71 | 1.71 | -2.00 |
| (-1,0,0) | 2.10 | 2.50 | 2.50 | 2.00 |
| (0,1,0) | 1.68 | 1.68 | 1.68 | -1.78 |
| (0,-1,0) | 1.67 | 1.83 | 1.83 | 1.78 |
| (0,0,1) | 1.65 | 1.65 | 1.65 | 0.92 |
| (0,0,-1) | 1.66 | 1.66 | 1.66 | -0.92 |
| (0.71,0.71,0) | 1.29 | 1.29 | 1.29 | -2.67 |
| (0.71,-0.71,0) | 1.27 | 1.27 | 1.27 | -0.16 |
| (-0.71,0.71,0) | 1.27 | 1.27 | 1.27 | 0.16 |
| (-0.71,-0.71,0) | 2.60 | 3.06 | 3.06 | 2.67 |
| (0.71,0,0.71) | 1.25 | 1.25 | 1.25 | -0.61 |
| (0.71,0,-0.71) | 1.27 | 1.27 | 1.27 | -1.91 |
| (-0.71,0,0.71) | 2.12 | 1.98 | 2.12 | 1.91 |
| (-0.71,0,-0.71) | 1.26 | 1.26 | 1.26 | 0.61 |
| (0,0.71,0.71) | 1.17 | 1.17 | 1.17 | -0.76 |
| (0,0.71,-0.71) | 1.26 | 1.26 | 1.26 | -2.06 |
| (0,-0.71,0.71) | 2.49 | 2.45 | 2.49 | 2.06 |
| (0,-0.71,-0.71) | 1.18 | 1.18 | 1.18 | 0.76 |
| (0.58,0.58,0.58) | 1.03 | 1.03 | 1.03 | -1.65 |
| (-0.58,0.58,0.58) | 1.12 | 1.09 | 1.12 | 0.66 |
| (0.58,-0.58,0.58) | 1.10 | 1.10 | 1.10 | 0.40 |
| (0.58,0.58,-0.58) | 1.08 | 1.08 | 1.08 | -2.71 |
| (-0.58,-0.58,0.58) | 2.94 | 3.06 | 3.06 | 2.71 |
| (0.58,-0.58,-0.58) | 1.10 | 1.10 | 1.10 | -0.66 |
| (-0.58,0.58,-0.58) | 1.11 | 1.11 | 1.11 | -0.40 |
| (-0.58,-0.58,-0.58) | 1.30 | 1.94 | 1.94 | 1.65 |

(UNIT:G)

FIG. 14

| MOUNTED PART | CONTENTS OF DIAGNOSIS | SUSPICIOUS DEVICE DETERMINATION (●:SUSPICIOUS DEVICE) | DIAGNOSIS TIME [SECOND] | |
|---|---|---|---|---|
| | | | WITHOUT NARROWING | WITH NARROWING |
| DISPLAY DEVICE | COUPLING CHECK TEST | | 2 | 0 |
| CPU | COUPLING CHECK TEST | | 2 | 0 |
| MEMORY | COUPLING CHECK TEST | | 2 | 0 |
| HDD | COUPLING CHECK TEST | | 2 | 0 |
| FAN | COUPLING CHECK TEST | | 2 | 0 |
| BATTERY | COUPLING CHECK TEST | ● | 2 | 2 |
| SPEAKER | COUPLING CHECK TEST | | 2 | 0 |
| USB CONTROLLER | COUPLING CHECK TEST | | 2 | 0 |
| SD CARD | COUPLING CHECK TEST | | 2 | 0 |
| SIM CARD | COUPLING CHECK TEST | | 2 | 0 |
| CONNECTOR | COUPLING CHECK TEST | | 2 | 0 |
| TOTAL | | | 22 | 2 |

…

DIAGNOSTIC METHOD, INFORMATION PROCESSING DEVICE, AND STORAGE MEDIUM

CROSS-REFERENCE TO RELATED APPLICATION

This application is based upon and claims the benefit of priority of the prior Japanese Patent Application No. 2015-145159, filed on Jul. 22, 2015, the entire contents of which are incorporated herein by reference.

FIELD

The embodiments discussed herein are related to a diagnostic method, an information processing device, and a storage medium.

BACKGROUND

In recent years, portable computers such as tablet terminals or notebook personal computers (PCs) have been widely used in classes at school or corporate activities carried out outside a company, such as sales and marketing activities, for example. These computers have a risk of a breakdown due to an accidental fall of the computer by a user. For this reason, a fall protection method for avoiding shock and damage due to a fall has been disclosed. Furthermore, there has been disclosed a technique for notifying a user of application of an impact force harmful to a notebook PC and warning the user of a possibility of a breakdown or causing the user to foresee a breakdown when the notebook PC is accidentally caused to fall or hit on a hard object. As related arts, Japanese Laid-open Patent Publication No. 2002-247153, Japanese Laid-open Patent Publication No. 2008-250391, and so forth have been disclosed for example.

Many devices are mounted in a computer. Therefore, if a method of making a diagnosis of whether or not the computer involves a breakdown about all devices in the computer sequentially is employed, possibly it is difficult to obtain the diagnosis result in a short time. For the user, it is desirable that a diagnosis of whether or not the computer involves a breakdown can be made in a shorter time.

SUMMARY

According to an aspect of the embodiments, a diagnostic method executed by a processor included in an information processing device, the information processing device including an acceleration sensor and a plurality of devices and having a function of executing a diagnosis of whether a breakdown is involved regarding each of the plurality of devices, the diagnostic method includes storing threshold information that is set regarding each of the plurality of devices and includes a plurality of directions and thresholds of acceleration components each corresponding to a respective one of the plurality of directions; receiving acceleration information from the acceleration sensor; calculating acceleration components each corresponding to the respective one of the plurality of directions by using the acceleration information when shock is detected from the acceleration information; extracting one or more devices having a possibility of a breakdown from the plurality of devices by comparing the acceleration components and the threshold information; and executing a diagnosis regarding the one or more devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating one example of narrowing of diagnosis targets;

FIG. 6 is one example of a shock influence threshold definition file;

FIG. 10 is one example of a shock influence threshold definition file;

FIG. 11 is a diagram representing one example of shock values calculated regarding each fall direction;

FIG. 12 is a diagram representing one example of a result of comparison between thresholds and shock values;

FIG. 14 is a diagram illustrating a comparative example of the time taken for diagnosis.

DESCRIPTION OF EMBODIMENTS

The embodiments will be described in detail below with reference to FIG. 1 to FIG. 14.

Figure 1:
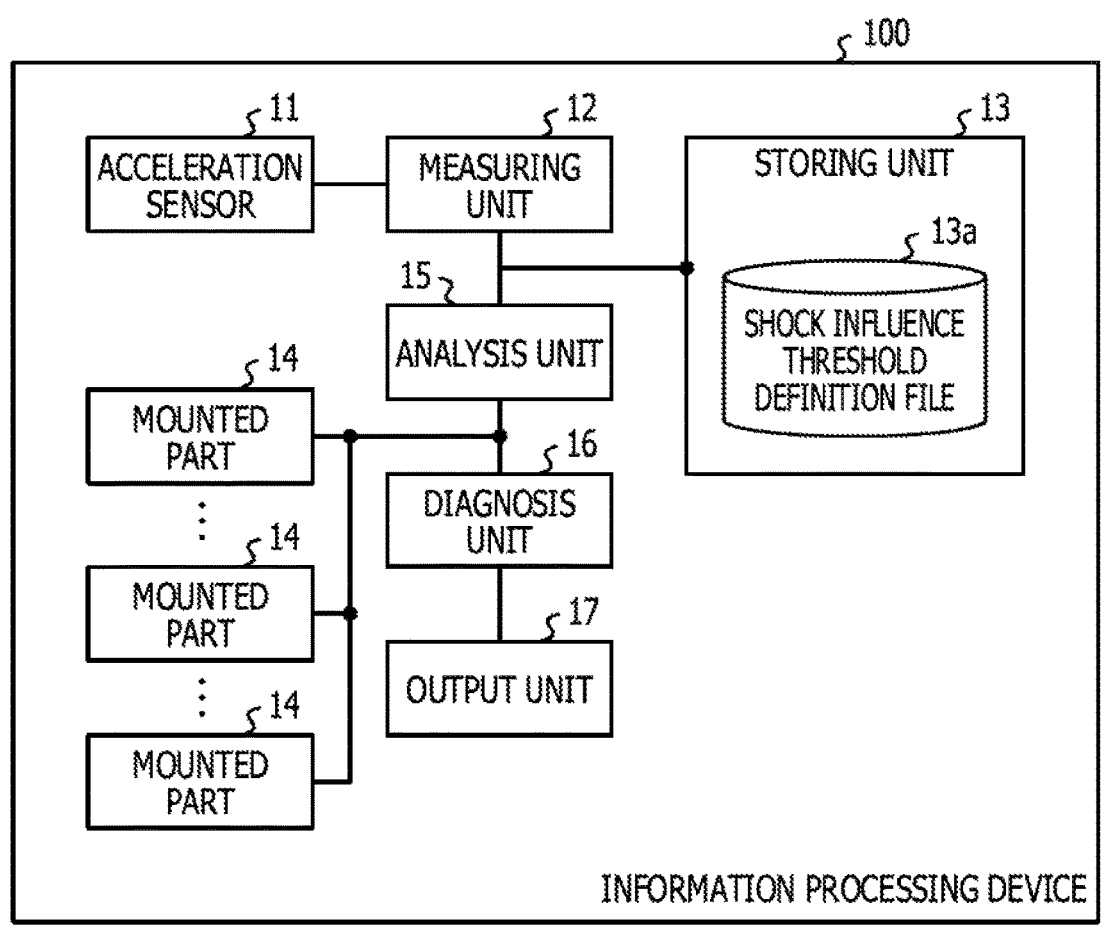
FIG. 1 is a functional block diagram of an information processing device.

FIG. 1 is a functional block diagram of an information processing device. As illustrated in FIG. 1, an information processing device 100 includes an acceleration sensor 11, a measuring unit 12, a storing unit 13, plural mounted parts 14, an analysis unit 15, a diagnosis unit 16, and an output unit 17. The information processing device 100 is a computer such as a tablet terminal, a notebook PC, a smartphone, or a mobile phone for example.

Functions of the respective units configuring the information processing device 100 will be described below.

The acceleration sensor 11 is a sensor for detecting the position or posture of the information processing device 100. The acceleration sensor 11 measures the acceleration of each of X direction, Y direction, and Z direction defined on the basis of the position of the information processing device 100 at given timing or at a given sampling interval. The coordinate axes used at the time of the measurement of the acceleration will be described later.

The measuring unit 12 receives acceleration information from the acceleration sensor 11. The acceleration information is information including data of the acceleration of each of the above-described X direction, Y direction, and Z direction. The measuring unit 12 transfers the received acceleration information to the analysis unit 15.

The storing unit 13 is hardware that stores data and programs used for processing executed by the information processing device 100. For example, in the storing unit 13, a shock influence threshold definition file 13a that is used for processing executed by the analysis unit 15 and includes threshold information can be stored. Details of the shock influence threshold definition file 13a will be described later. It is also possible for the storing unit 13 to store a program for a diagnosis executed by the diagnosis unit 16.

The storing unit 13 is a hard disk drive (HDD), a solid state drive (SSD), a random access memory (RAM), a flash memory, or a read only memory (ROM) for example, and may be a combination of any of these media. For example, an HDD, an SSD, a RAM, and a NAND flash memory can be used for storing data. On the other hand, a NOR flash memory and a ROM can be used for storing programs. It is also possible for the storing unit 13 to include plural storing devices depending on the use purpose or the desired storage capacity.

The mounted parts 14 are devices mounted in the information processing device 100 and are devices in which a breakdown is possibly caused due to a fall or shock in a specific direction. That is, the mounted parts 14 are devices that possibly become a diagnosis target in the present embodiment. For example, in a computer using Windows (registered trademark) as an operating system (OS), each of devices displayed in the device manager can be cited as the mounted part 14. Concrete examples of the mounted part 14 will be described later. The breakdown includes operation failure, breakages, and troubles such as connector unplugging.

The analysis unit 15 extracts one or more suspicious devices having a possibility of a breakdown from the mounted parts 14 by using the acceleration information received from the measuring unit 12. That is, the analysis unit 15 can carry out narrowing of the suspicious device on the basis of the acceleration information.

The diagnosis unit 16 makes a diagnosis of whether or not the suspicious device has a possibility of a breakdown about each of the one or more suspicious devices identified by the analysis unit 15. In the diagnosis, a coupling check test for checking whether or not electrical coupling with an internal circuit is kept is carried out for example.

The output unit 17 is hardware that can output the diagnosis result by the diagnosis unit 16.

Figure 2:
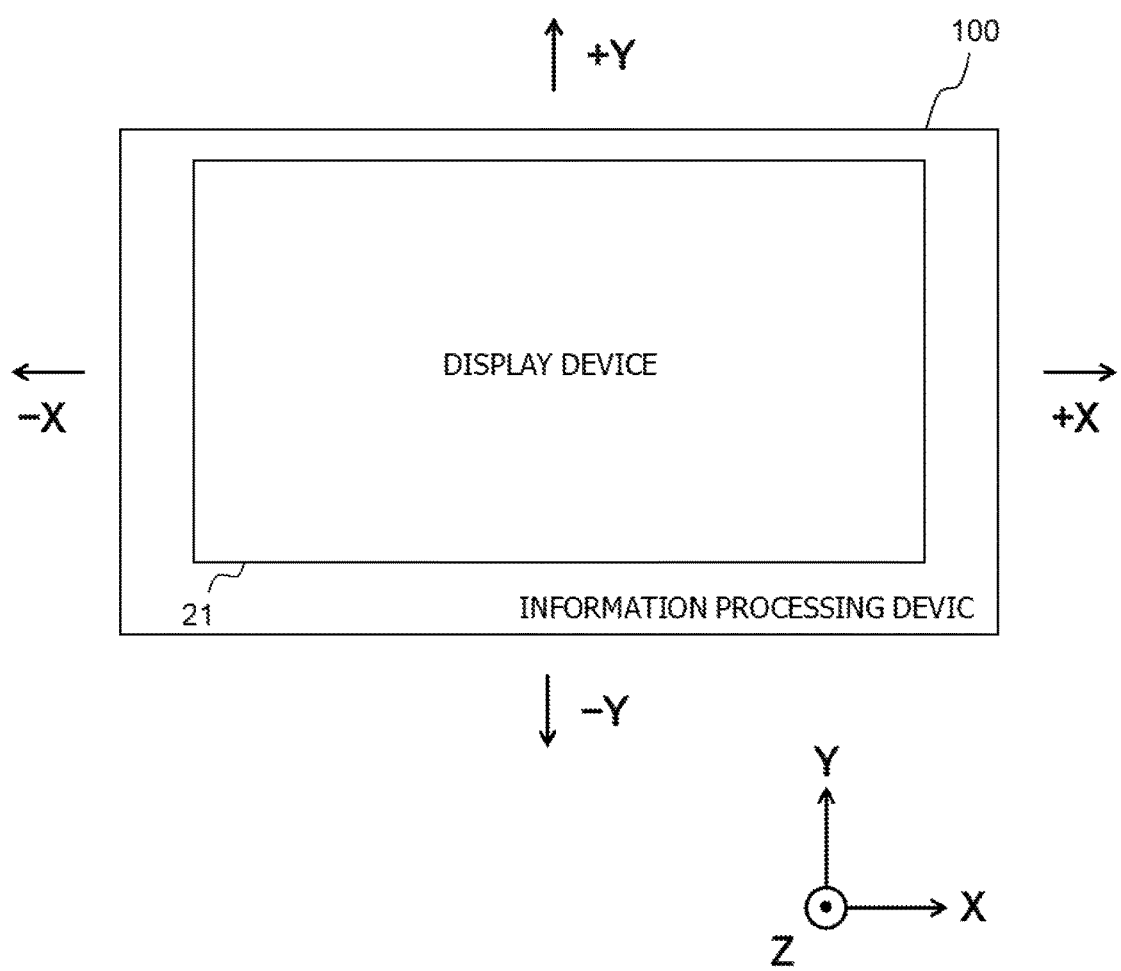
FIG. 2 is a diagram illustrating one example of a hardware configuration of a front surface of an information processing device.

FIG. 2 is a diagram illustrating one example of a hardware configuration of a front surface of an information processing device. The information processing device illustrated in FIG. 2 may be the information processing device 100 illustrated in FIG. 1. As illustrated in FIG. 2, the information processing device 100 includes a display device 21. Each arrow in FIG. 2 indicates a direction when coordinate axes (X-axis, Y-axis, and Z-axis) are set, with the central position of the information processing device 100 defined as the origin. The X-axis and the Y-axis are coordinate axes parallel to the plane of paper and are orthogonal to each other. The Z-axis is a coordinate axis perpendicular to the plane of paper and is orthogonal to the X-axis and the Y-axis.

The display device 21 is a liquid crystal display (LCD), a plasma display panel (PDP), an organic electroluminescence (EL) display, or the like for example. It is also possible for the display device 21 to include a touch panel in addition to the above-described various kinds of displays. The display device 21 displays information about devices having a possibility of a breakdown or devices involving a breakdown on the screen and thereby can visually notify a user of this information. The display device 21 is one example of the output unit 17.

Figure 3:
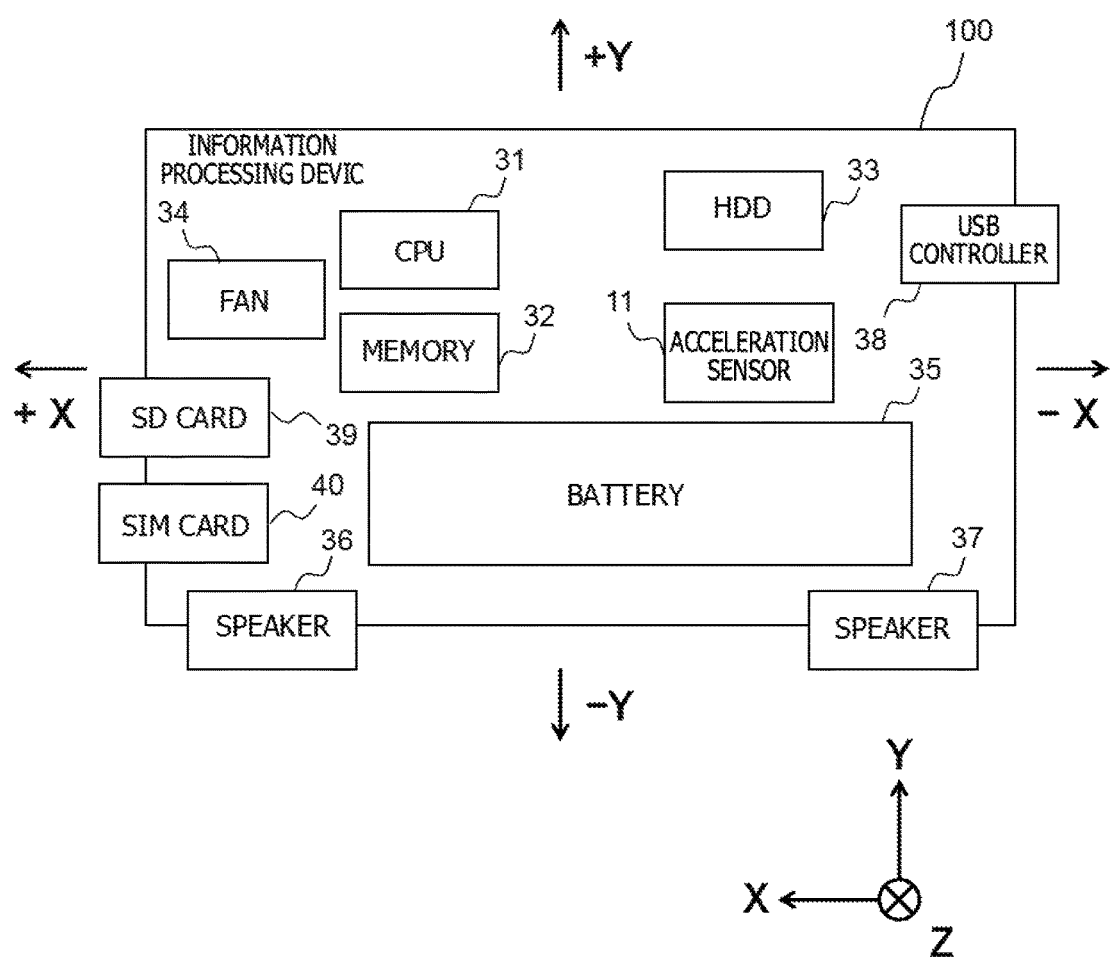
FIG. 3 is a diagram illustrating one example of a hardware configuration of a back surface of an information processing device.

FIG. 3 is a diagram illustrating one example of a hardware configuration of a back surface of an information processing device. The information processing device illustrated in FIG. 3 may be the information processing device 100 illustrated in FIG. 1. As illustrated in FIG. 3, the information processing device 100 includes the acceleration sensor 11, a central processing unit (CPU) 31, a memory 32, an HDD 33, a fan 34, a battery 35, a speaker 36, a speaker 37, a universal serial bus (USB) controller 38, a secure digital (SD) card 39, and a subscriber identity module (SIM) card 40. Each arrow in FIG. 3 also indicates a direction when coordinate axes (X-axis, Y-axis, and Z-axis) are set on the basis of the central position of the information processing device 100. However, because FIG. 3 illustrates the back surface of the information processing device 100, the positive and negative sides of the directions of the coordinate system are opposite to those in FIG. 2. The acceleration sensor 11, the CPU 31, the memory 32, the HDD 33, the fan 34, the battery 35, the speaker 36, the speaker 37, the USB controller 38, the SD card 39, and the SIM card 40 are each one example of the mounted part 14.

The acceleration sensor 11 illustrated in FIG. 3 corresponds to the acceleration sensor 11 illustrated in FIG. 1 and therefore is given the same numeral.

The CPU 31 is hardware that manages or executes processing of the information processing device 100. A micro processing unit (MPU) is also one example of the CPU 31. The CPU 31 is one example of the measuring unit 12, the analysis unit 15, and the diagnosis unit 16.

The memory 32 and the HDD 33 are pieces of hardware that store data and programs used for processing executed by the CPU 31. The memory 32 and the HDD 33 are one example of the storing unit 13.

The fan 34 is a cooling device configured to cool the plural mounted parts 14 such as the CPU 31 and the HDD 33 that become a high temperature due to processing operation. The fan 34 includes blades and can cool the mounted parts 14 by a wind generated by the rotation of the blades.

The battery 35 is a power supply device used for driving the information processing device 100. For example, a lithium ion battery is used as the battery 35.

The speaker 36 and the speaker 37 are devices configured to output sound information. The speaker 36 and the speaker 37 output information about devices having a possibility of a breakdown or devices involving a breakdown by sounds and thereby can auditorily notify a user of this information. The speaker 36 and the speaker 37 are one example of the output unit 17.

The USB controller 38 is a device configured to carry out control of the USB.

The SD card 39 is a storage medium that is inserted into the information processing device 100 and is for storing information on still images and moving images. An SD card reading device that is hardware for carrying out reading of the information stored in the SD card 39 or writing of information to the SD card 39 is also one example of the mounted part 14.

The SIM card 40 is a storage medium that is inserted into the information processing device 100 and is for storing information to identify the registrant and so forth. An SIM card reading device that is hardware for reading out the information stored in the SIM card 40 is also one example of the mounted part 14.

Next, a diagnostic method carried out by the information processing device 100 in the present embodiment will be described.

In the present embodiment, by using the acceleration information of the information processing device 100 and the shock influence threshold definition file 13a, narrowing of suspicious devices having a high possibility of a breakdown, Le diagnosis targets, is carried out from the plural devices configuring the information processing device 100.

FIG. 4 is a diagram illustrating one example of narrowing of diagnosis targets. In FIG. 4, the reference numerals of the plural devices configuring the information processing device 100 illustrated in FIG. 3, i.e. the respective mounted parts 14, are omitted. Among the plural mounted parts 14, suspicious devices are indicated by thick frames. As illustrated in FIG. 4, due to the execution of narrowing processing, the suspicious devices decrease to only the HDD and the two speakers.

Next, a method for narrowing the diagnosis targets will be described. First, the background to use the shock influence threshold definition file 13a will be described.

The present inventor has found that the probability of a breakdown of each mounted part 14 mounted in the information processing device 100 differs for each of fall directions of the information processing device 100 through a fall test carried out for evaluating the durability of the information processing device 100. Moreover, the present inventor has found that the probability of a breakdown of each mounted part 14 regarding each fall direction differs depending on the kind of the information processing device 100 and depends on the mounting environment in the information processing device 100, such as the mounting position of the mounted part 14, the coupling direction of a connector coupled to the mounted part 14, or the method for mounting the mounted part 14 on a motherboard or a casing, for example. The present embodiment makes a diagnosis of whether or not a computer involves a breakdown by using the point that the device having a possibility of a breakdown differs depending on the fall direction of the information processing device 100, i.e. the direction in which the information processing device 100 receives shock due to the fall.

Figure 5:
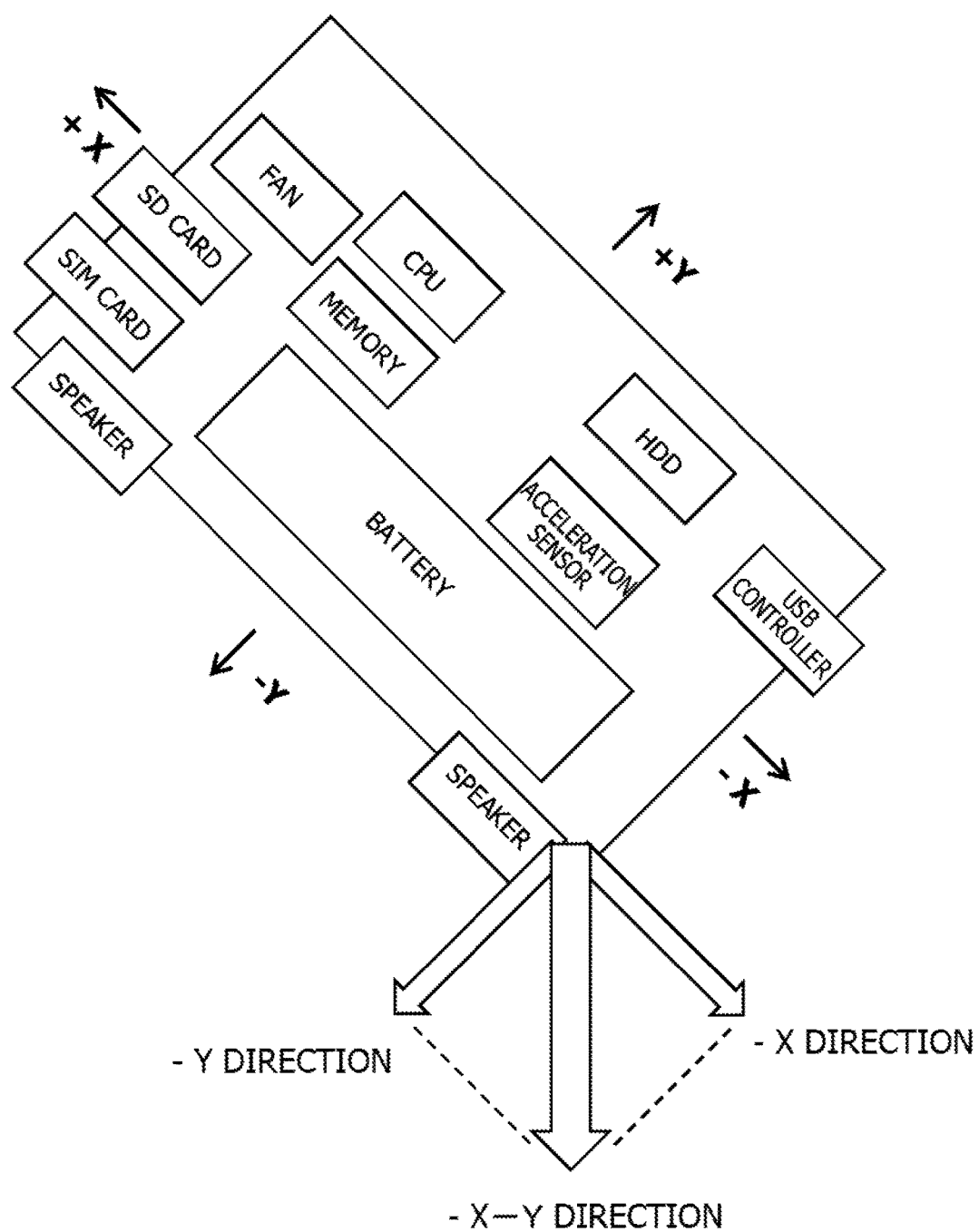
FIG. 5 is a diagram illustrating a fall of an information processing device in a direction resulting from synthesis of −X direction and −Y direction.

FIG. 5 is a diagram illustrating a fall of an information processing device in a direction resulting from synthesis of −X direction and −Y direction. The information processing device illustrated in FIG. 5 may be the information processing device 100 illustrated in FIG. 3. In the following description, a direction obtained by synthesis of the −X direction and the −Y direction will be represented as "−X−Y direction."

In the present embodiment, the magnitude of the acceleration of the information processing device 100 is regarded as the magnitude of shock received by the information processing device 100, i.e. a shock value. Furthermore, a threshold of an acceleration component serving as a criterion for determining that a diagnosis is to be made (shock influence threshold) is set for each of the mounted parts 14 and this threshold is individually set regarding each of various fall directions.

The shock influence threshold definition file 13a is a file that indicates, by a table, the threshold set about each fall direction regarding each of the mounted parts 14 mounted in the information processing device 100.

FIG. 6 is one example of a shock influence threshold definition file. The shock influence threshold definition file illustrated in FIG. 6 may be the shock influence threshold definition file 13a illustrated in FIG. 1. In the shock influence threshold definition file 13a, the fall direction, the kind of the mounted part 14, and the threshold are registered in association with each other. As described above, the device having a possibility of a breakdown differs depending on the direction in which shock is received. Therefore, in the field of the threshold, a smaller threshold is set regarding the fall direction in which the influence due to shock is received more readily than regarding the other directions. By setting the thresholds different for each direction on the basis of whether or not the influence due to shock of a fall is present or the degree of the influence in this manner, the device having a possibility of a breakdown can be easily identified.

If the shock value received at the time of a fall is equal to or smaller than the threshold, the information processing device 100 determines that the possibility that the device corresponding to this threshold normally operates is high, and excludes this device from the diagnosis targets. On the other hand, if the shock value received at the time of a fall is larger than the threshold, the information processing device 100 determines that the possibility that the device corresponding to this threshold breaks is high, and decides this device as a diagnosis target.

The shock value of each direction can be calculated by obtaining the inner product of the acceleration information measured by the acceleration sensor 11 and the unit vector of the selected direction. In the following, a calculation example of the shock value will be described and an example in which the diagnosis target is decided will be described with reference to FIG. 6.

For example, if acceleration of −3.00 G, 0, and 0 is measured in the X direction, the Y direction, and the Z-direction, respectively, by the acceleration sensor 11, the acceleration information is represented as $A_1=(-3.00, 0, 0)$. In this case, the shock value of the −X direction can be calculated as $A_1 \cdot e_{-X} = -3.00 \times (-1) + 0 \times 0 + 0 \times 0 = 3.00$ [G] by using a unit vector $e_{-X} = (-1, 0, 0)$ of the −X direction.

The shock value of the −Y direction can be calculated as $A_1 \cdot e_{-Y} = -3.00 \times 0 + 0 \times (-1) + 0 \times 0 = 0$ [G] by using a unit vector $e_{-Y} = (0, -1, 0)$ of the −Y direction.

The shock value of the −X−Y direction can be calculated as $A_1 \cdot e_{-X-Y} = 3.00 \times (-0.707) + 0 \times (-0.707) + 0 \times 0 \approx 2.12$ [G] by using a unit vector $e_{-X-Y} = (-0.707, -0.707, 0)$ of the −X−Y direction. The values "−0.707" of elements of the above-described unit vector of the −X−Y direction and the shock value "2.12" of the −X−Y direction are represented with three-digit accuracy in view of easiness of explanation.

Here, reference to FIG. 6 makes it understood that the calculated shock value 3.00 G of the −X direction is smaller than a threshold 5.00 G of the battery in the −X direction and a threshold 3.11 G of the speaker in the −X direction and is larger than a threshold 2.50 G of the HDD in the −X direction. Thus, among the battery, the HDD, and the speaker, only the HDD, whose shock value surpasses the threshold, becomes a diagnosis target.

On the other hand, for example if acceleration of −1.71 G, −1.41 G, and 0 is measured in the X direction, the Y direction, and the Z direction, respectively, by the acceleration sensor 11, the acceleration information is represented as $A_2 = (-1.71, -1.41, 0)$. In this case, by obtaining each of the inner products of the vector $A_2$ and the unit vectors of the respective directions similarly, the shock value of the −X direction is calculated as 1.71 G, and the shock value of the −Y direction is calculated as 1.41 G, and the shock value of the −X−Y direction is calculated as 2.21 G.

Here, reference to FIG. 6 makes it understood that the calculated shock value 2.21 G of the −X−Y direction is smaller than a threshold 2.82 G of the battery in the −X−Y direction and a threshold 3.54 G of the HDD in the −X−Y direction and is larger than a threshold 2.20 G of the speaker in the −X−Y direction. Thus, among the battery, the HDD, and the speaker, only the speaker, whose shock value surpasses the threshold, becomes a diagnosis target.

A method for setting the thresholds registered in the shock influence threshold definition file 13a will be described below. For example, in a fall test carried out for evaluating the durability at the time of development of the information processing device 100, the supplier of the information processing device 100 causes the information processing device 100 to fall plural times at various angles and measures the acceleration by the acceleration sensor 11 in every fall. Subsequently, the supplier uses information on the acceleration to calculate the acceleration component of each fall direction as the shock value by inner product calculation. Then, the supplier sets the maximum value among the shock values with which a breakdown is not caused as the threshold regarding each of the plural mounted parts 14. According to the above-described method, the relationship between the fall direction of the information processing device 100 and the device that possibly breaks when the information processing device 100 falls in this fall direction can be grasped in advance and the thresholds according to the relationship can be set regarding each fall direction.

On the other hand, if the information processing device 100 is a version-upgraded enhanced device, it is also possible to divert the shock influence threshold definition file stored in the information processing device of the old version as the shock influence threshold definition file 13a of the information processing device 100. It is also possible to execute the above-described processing in accordance with control by a computer. In the above-described manner, the thresholds registered in the shock influence threshold definition file 13a are set.

Next, the flow of diagnostic processing executed by the information processing device 100 will be described.

Figure 7:
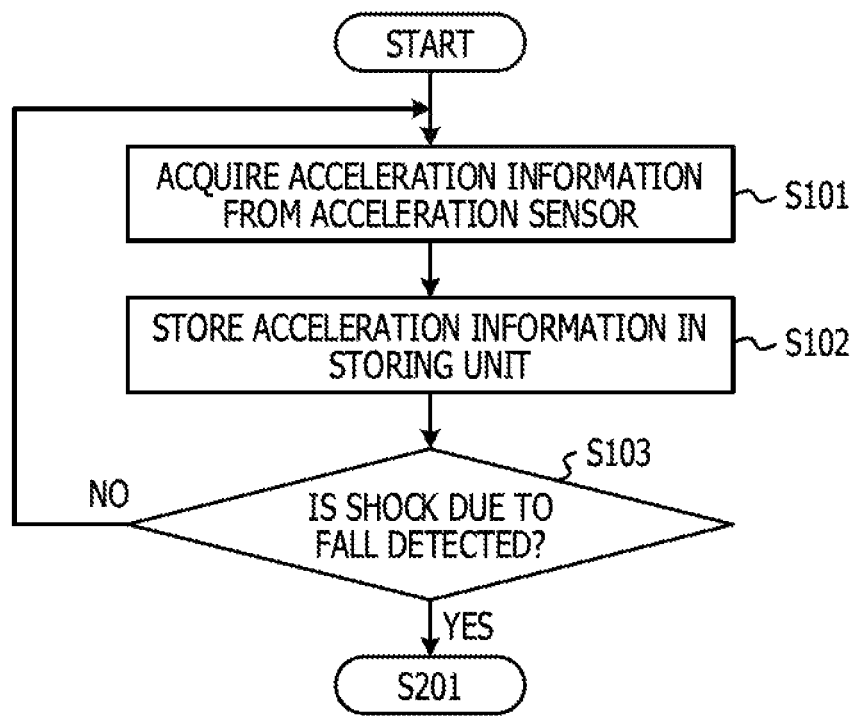
FIG. 7 is a flowchart (first) illustrating one example of a diagnostic method by an information processing device.

FIG. 7 is a flowchart (first) illustrating one example of a diagnostic method by an information processing device. The information processing device described with reference to FIG. 7 may be the information processing device 100 illustrated in FIG. 1.

Figure 8A:
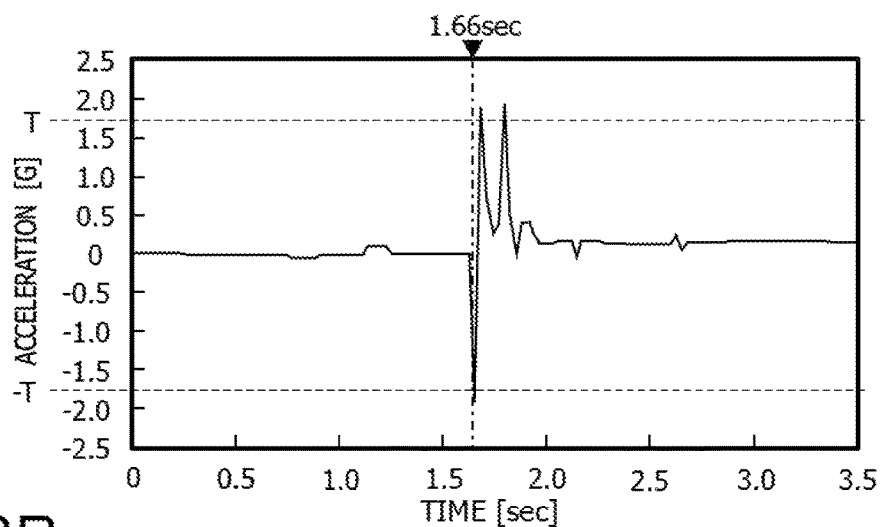
FIG. 8A, FIG. 8B, and FIG. 8C are diagrams representing one example of acceleration information at the time of a free fall.
Figure 8B:
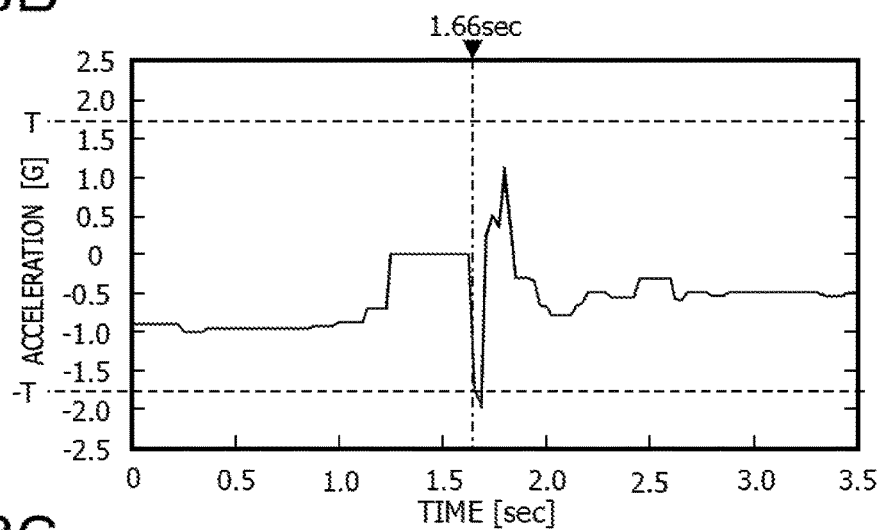
Figure 8C:
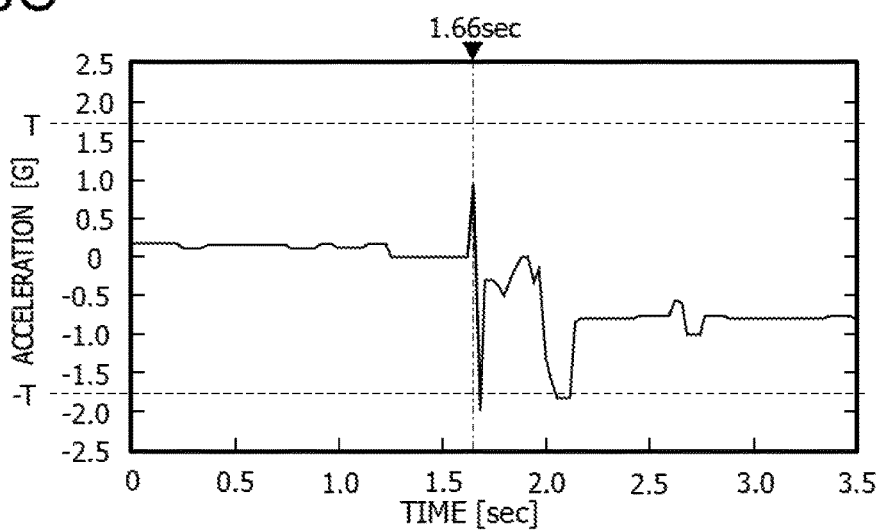

First, the acceleration sensor 11 measures the acceleration of the information processing device 100. FIG. 8A, FIG. 8B, and FIG. 8C are diagrams representing one example of time change of the acceleration at the time of a free fall. The abscissa axis indicates the time (unit: second) and the ordinate axis indicates the acceleration (unit: G). FIG. 8A, FIG. 8B, and FIG. 8C represent time change of the acceleration in the X-axis direction, the Y-axis direction, and the Z-axis direction, respectively. As represented in FIG. 8A, FIG. 8B, and FIG. 8C, the acceleration sensor 11 measures the acceleration regarding each of the X-axis direction, the Y-axis direction, and the Z-axis direction. The measurement of the acceleration by the acceleration sensor 11 is triggered by timing when change in the acceleration is detected, such as when the change in the acceleration surpasses a change amount set in advance, for example. Alternatively, it is also possible for the acceleration sensor 11 to measure the acceleration not at the above-described irregular timing but at a given sampling interval periodically. The sampling interval at this time is approximately 0.02 to 0.10 seconds for example.

Subsequently, the measuring unit 12 of the information processing device 100 receives acceleration information from the acceleration sensor 11 at a given time interval by polling (S101). Then, the measuring unit 12 stores the received acceleration information in the storing unit 13 (S102). The acceleration information is represented by a direction vector A(x, y, z) including the respective vectors of the X-axis, the Y-axis, and the Z-axis as elements.

Subsequently, the measuring unit 12 determines whether or not shock due to a fall is detected (S103). For example, the measuring unit 12 refers to the received acceleration information and determines that shock is detected if a value beyond a given threshold T or −T is detected from the respective elements of the direction vector. In the example of FIG. 8A, FIG. 8B, and FIG. 8C, the threshold is defined as T=1.75 G and the levels of T and −T are indicated by dashed lines.

If it is not determined that shock due to a fall is detected (No of S103), the measuring unit 12 moves to S101 and executes the processing of S101 and the subsequent processing again. On the other hand, if it is determined that shock due to a fall is detected (Yes of S103), the processing moves to S201 in FIG. 9.

Figure 9:
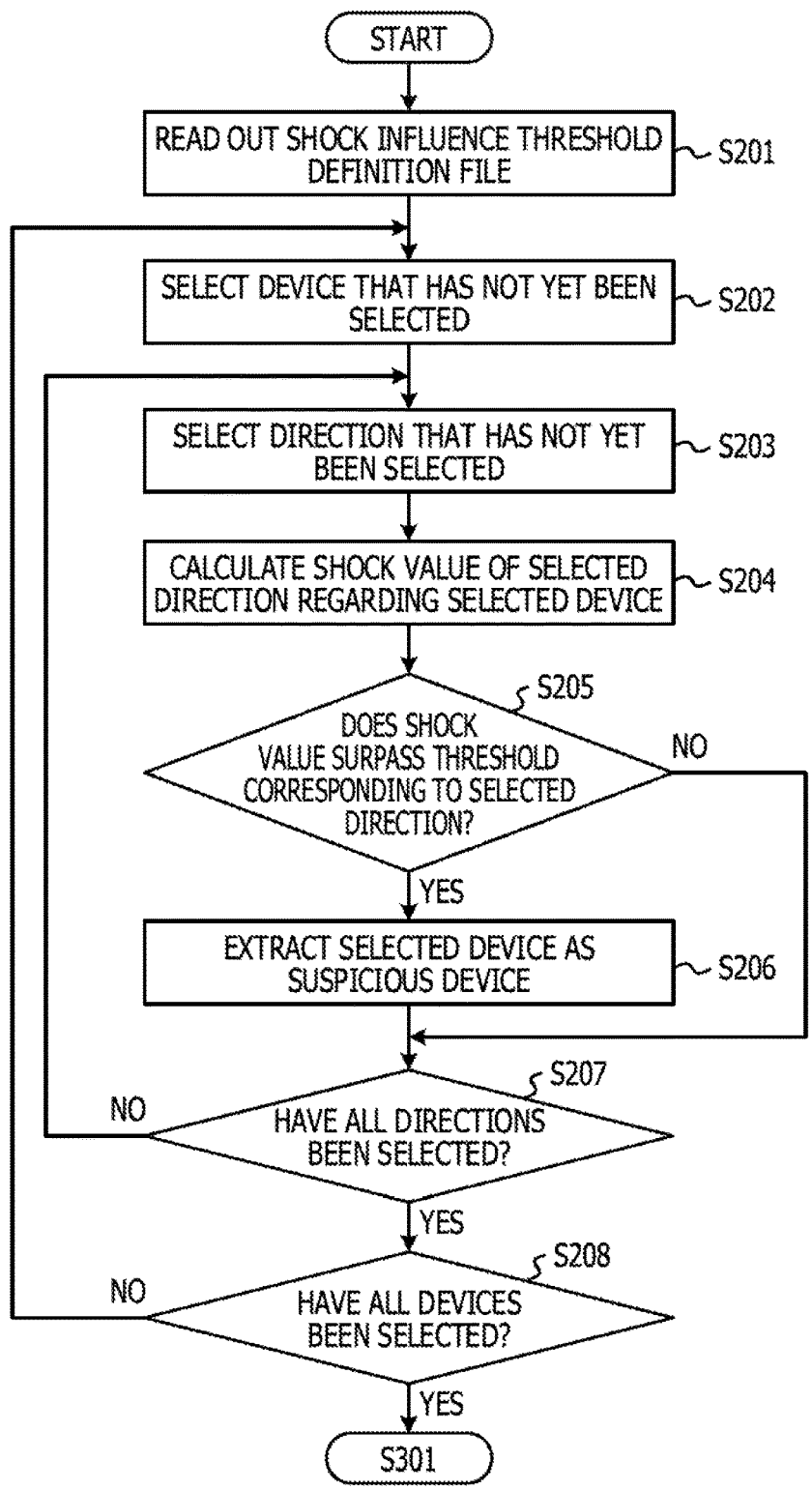
FIG. 9 is a flowchart (second) illustrating one example of a diagnostic method by an information processing device.

FIG. 9 is a flowchart (second) illustrating the one example of the diagnostic method by the information processing device 100.

If the measuring unit 12 detects shock and the positive determination is made in S103, the analysis unit 15 reads out the shock influence threshold definition file 13a from the storing unit 13 (S201).

FIG. 10 is one example of a shock influence threshold definition file. The shock influence threshold definition file illustrated in FIG. 10 may be the shock influence threshold definition file 13a illustrated in FIG. 1. In the example of FIG. 10, a unit vector e(x, y, z) of each direction is stored in the field of the fall direction. Values of "0.71," "−0.71," "0.58," and "−0.58" among the elements of the unit vectors displayed in FIG. 10 are represented with two-digit accuracy in view of easiness of reading of the table. As the fall direction, twenty six directions are employed as the subjects. That is, thresholds are set regarding not only directions parallel to the X-axis, the Y-axis, and the Z-axis but also directions obtained by combining plural coordinate axes. Due to this, the determination of whether or not to make a diagnosis can be carried out more accurately also regarding devices vulnerable to shock in the direction obtained by combining plural coordinate axes. In the following description, the fall direction will be often referred to as "(x, y, z) direction" by using the unit vector. In the example of FIG. 1, the shock influence threshold definition file 13a is stored in the storing unit 13. However, it is also possible to store the shock influence threshold definition file 13a in another information processing device or storing device that is coupled to the information processing device 100 by a network and is capable of radio communications.

Referring back to FIG. 9, after the processing of S201, the analysis unit 15 selects a device that has not yet been selected among the plural mounted parts 14 mounted in the information processing device 100 (S202). The selected device becomes the target of analysis by the analysis unit 15.

Subsequently, the analysis unit 15 selects a direction that has not yet been selected among the plural fall directions set in the shock influence threshold definition file 13a (S203).

Subsequently, the analysis unit 15 calculates the shock value of the selected direction regarding the selected device (S204). The shock value of the selected direction can be calculated by obtaining the inner product of the acceleration information measured by the acceleration sensor 11 and the unit vector of the selected direction. First, referring to FIG. 8A FIG. 8B, and FIG. 8C, a direction vector A of the acceleration is acquired from the intersections of one-dot chain lines and the respective graphs. For example, the acceleration information at t=1.66 seconds can be read as A=(−2.00, −1.78, 0.92) from the intersections of the one-dot chain lines and the graphs. Then, if the direction selected in S203 is (0, −1, 0) direction, the shock value at t=1.66 seconds can be calculated as A·e=−2.00×0−1.78×(−1)+0.92×0=1.78 [G] by using the unit vector e=(0, −1, 0).

After the processing of S204, the analysis unit 15 determines whether or not the shock value calculated in S204 surpasses the threshold corresponding to the selected direction (S205). For example, if the battery is selected as the analysis target in S202, the threshold corresponding to (0, −1, 0) direction is 1.67 G according to the shock influence threshold definition file 13a of FIG. 10. If the shock value calculated in S204 is 1.78 G, this value is larger than 1.67 G. Thus, in this case, it is determined that the shock value calculated in S204 surpasses the threshold corresponding to the selected direction.

If it is determined that the shock value calculated in S204 surpasses the threshold corresponding to the selected direction (Yes of S205), the analysis unit 15 extracts the selected device as a suspicious device having a possibility of a breakdown (S206). Then, the analysis unit 15 moves to S207. On the other hand, if it is determined that the shock value calculated in S204 does not surpass the threshold corresponding to the selected direction (No of S205), the analysis unit 15 moves to S207. In the example of FIG. 9, the analysis unit 15 executes reading out of the shock influence threshold definition file 13a in S201. However, the analysis unit 15 may execute the determination processing of S205 with reference to the shock influence threshold definition file 13a stored in the storing unit 13 without executing the reading processing of S201. According to this method, the processing of S201 can be omitted.

Subsequently, in S207, the analysis unit 15 determines whether or not all directions have been selected. If it is determined that all directions have not been selected (No of S207), the analysis unit 15 moves to S203 and executes the processing of S203 and the subsequent processing again. On the other hand, if it is determined that all directions have been selected (Yes of S207), the analysis unit 15 determines whether or not all devices of the mounted parts 14 have been selected (S208). If it is determined that all devices of the mounted parts 14 have not been selected (No of S208), the analysis unit 15 moves to S202 and executes the processing of S202 and the subsequent processing again. On the other hand, if it is determined that all devices of the mounted parts 14 have been selected (Yes of S208), the processing moves to S301 in FIG. 13.

FIG. 11 is a diagram representing one example of shock values calculated regarding each fall direction. FIG. 11 represents the shock values that are calculated on the basis of the acceleration information A=(−2.00, −1.78, 0.92) of the information processing device 100 and affect each of the twenty six kinds of fall directions. At the stage when the series of processing illustrated in FIG. 9 is completed, the information processing device 100 can obtain data on all shock values relating to the twenty six directions.

FIG. 12 is a diagram representing one example of a result of comparison between thresholds and shock values. As represented in thick frames in FIG. 12, the calculated shock value of (0, −1, 0) direction surpasses the threshold corresponding to (0, −1, 0) direction of the battery. The shock value of (−0.71, −0.71, 0) direction surpasses the threshold corresponding to (−0.71, −0.71, 0) direction of the battery. The shock value of (−0.58, −0.58, −0.58) direction surpasses the threshold corresponding to (−0.58, −0.58, −0.58) direction of the battery. On the other hand, none of the calculated shock values of the respective directions surpasses the thresholds of the display device and the SIM card corresponding to a respective one of the directions. From this, in the example of FIG. 9, the display device and the SIM card are not extracted as the suspicious device and only the battery is extracted as the suspicious device.

In the above-described manner, the information processing device 100 can extract the suspicious device from the plural mounted parts 14.

Figure 13:
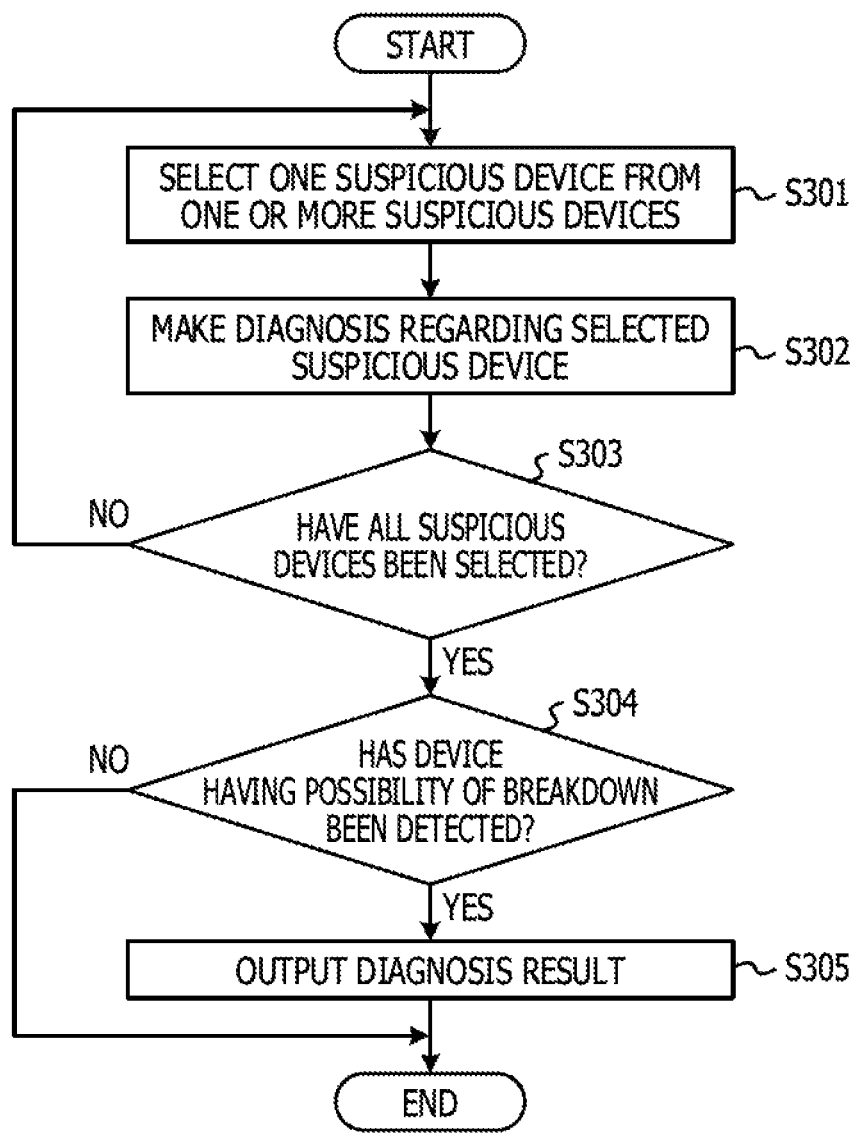
FIG. 13 is a flowchart (third) illustrating one example of a diagnostic method by an information processing device.

FIG. 13 is a flowchart (third) illustrating the one example of the diagnostic method by the information processing device 100.

After the extraction of the suspicious device through the series of processing illustrated in FIG. 9, the diagnosis unit 16 selects one suspicious device from the extracted one or more suspicious devices (S301).

Subsequently, the diagnosis unit 16 makes a diagnosis of whether or not there is a possibility of a breakdown regarding the selected suspicious device (S302). The diagnosis is made about a test item decided in advance according to the kind of suspicious part. The test item is not limited to one kind. The diagnosis is made when the information processing device 100 is in the still state and is not made when the information processing device 100 is falling.

Subsequently, the diagnosis unit 16 determines whether or not all suspicious devices have been selected (S303). If it is determined that all suspicious devices have not been selected (No of S303), the diagnosis unit 16 returns to S301 and executes the processing of S301 and the subsequent processing again. On the other hand, if it is determined that all suspicious devices have been selected (Yes of S303), the diagnosis unit 16 determines whether or not a device having a possibility of a breakdown has been detected as the result of the diagnosis (S304).

In S304, the determination is made on the basis of the result of the diagnosis regarding each suspicious device, executed in S302. If it is determined that a device having a possibility of a breakdown has not been detected (No of S304), the processing by the information processing device 100 is ended. On the other hand, if it is determined that a device having a possibility of a breakdown has been detected (Yes of S304), the output unit 17 outputs a diagnosis result relating to the device having a possibility of a breakdown on the basis of an instruction by the diagnosis unit 16 (S305).

The output of the diagnosis result in S305 can be carried out by the display device 21 or the speakers 36 and 37 or by the display device 21 and the speakers 36 and 37 in combination for example. In the output of the diagnosis result, it is also possible to indicate not only the device from which abnormality is detected but also the range on which the occurrence of the abnormality has an influence, a coping method, and so forth for example. Alternatively, it is also possible to indicate a warning relating to the device from which abnormality is detected. For example, if the information processing device 100 is caused to fall when the information processing device 100 is coupled to an alternating current (AC) adapter and coupling failure of a battery is detected by a diagnosis, it can be indicated that heat generation or a burnout of the battery when use of the information processing device 100 is continued is anticipated. In addition, a warning to immediately power off the information processing device 100 can be made.

In the above-described manner, the diagnostic processing by the information processing device 100 is executed.

FIG. 14 is a diagram illustrating a comparative example of the time taken for diagnosis. FIG. 14 represents the diagnosis time when only a coupling check test is carried out as the diagnosis regarding the mounted parts 14. The device group represented in FIG. 14 indicates all mounted parts 14. As represented in FIG. 14, twenty two seconds are taken as the diagnosis time if the information processing device 100 does not carry out narrowing of the mounted parts 14, i.e. if the information processing device 100 makes the diagnosis regarding all mounted parts 14. On the other hand, the diagnosis time is shortened to two seconds if the information processing device 100 carries out the narrowing of the mounted parts 14, i.e. if the information processing device 100 identifies only the battery as the suspicious device and makes the diagnosis regarding only the battery.

As above, according to the present embodiment, the narrowing of the suspicious devices can be carried out by using the acceleration information of the information processing device 100 and the shock influence threshold definition file 13a. Thus, the diagnosis of whether or not a portable computer involves a breakdown can be made in a short time compared with the method of making a diagnosis regarding all mounted parts 14. According to the present embodiment, the suspicious device can be extracted in a short time. Thus, in the period from a fall of the information processing device 100 to picking-up of the information processing device 100, whether or not the information processing device 100 is to be repaired or whether or not the information processing device 100 can be continuously used can be rapidly notified to the user.

Although the preferred embodiment of the present disclosure is described in detail above, the present disclosure is not limited to a specific embodiment and various modifications and changes can be made. For example, in the present embodiment, the case in which the information processing device 100 is caused to fall is assumed, and description is made by using a parameter of the "fall direction." However, techniques of the present disclosure can be applied to not only the case in which the information processing device 100 is caused to fall but also the case in which the information processing device 100 is caused to hit on a hard object for example.

For example, each threshold of the acceleration component included in the shock influence threshold definition file 13a can be updated. For example, it is possible to carry out update such as increasing the threshold if it is determined that the present value of the threshold is not suitable on the basis of accumulated diagnosis results. Alternatively, generally the probability of the breakdown rises irrespective of the kind of device as the number of times of collision increases. Therefore, it is also possible to carry out update such as decreasing the threshold according to the number of times of collision.

It is also possible to carry out update of the shock influence threshold definition file 13a by using an update program such as a patch. For example, if plural portable computers are centrally controlled in school or the like, it is possible to update the shock influence threshold definition files 13a in the computers according to need by automatically delivering an update program to these computers. Alternatively, it is a so possible that, when a computer reaches a repair center or the like of the manufacturer for repair, operation of updating the shock influence threshold definition file 13a in the computer to the latest file is carried out on the repair center side.

A computer program that causes a computer to implement the above-described portable terminal device and control method and a non-transitory computer-readable recording medium in which the program is recorded are included in the range of the present disclosure. Here, the non-transitory computer-readable recording medium is a memory card such as an SD memory card for example. The above-described computer program is not limited to a program recorded in the above-described recording medium and may be a program transmitted via an electric communication line, a wireless or wired communication line, a network typified by the Internet, or the like.

All examples and conditional language recited herein are intended for pedagogical purposes to aid the reader in understanding the invention and the concepts contributed by the inventor to furthering the art, and are to be construed as being without limitation to such specifically recited examples and conditions nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A diagnostic method executed by a processor, a memory, and an acceleration sensor that are included in an information processing device, the information processing device including a plurality of devices which are different from the acceleration sensor, the information processing device having a function of executing a diagnosis of whether a breakdown is involved regarding each of the plurality of devices, the memory storing therein threshold information that is set for each of the plurality of devices, and the threshold information including a plurality of directions and thresholds of acceleration components each corresponding to a respective one of the plurality of directions, the plurality of directions being associated with each of the devices and defined by a given coordinate system, the diagnostic method comprising:

transmitting, by the acceleration sensor, acceleration information of the information processing device when the information processing device falls or impacts an object;

receiving, by the processor, the acceleration information transmitted from the acceleration sensor;

calculating, by the processor, acceleration components each corresponding to a respective one of the plurality of directions from the received acceleration information;

selecting, by the processor, one or more devices having a possibility of a breakdown from among the plurality of devices by comparing each of the calculated acceleration components with a threshold of each corresponding acceleration component in each threshold information stored in the memory, wherein each of the calculated acceleration components corresponds to each acceleration component with respect to a direction of the plurality of directions; and executing, by the processor, a diagnosis regarding the selected one or more devices.

2. The diagnostic method according to claim 1, wherein the selecting by the processor includes, when at least one of the calculated acceleration components surpasses one of the thresholds of the acceleration components for the respective one of the plurality of directions corresponding to the respective one of the plurality of directions of the at least one of the calculated acceleration components, selecting by the processor a device corresponding to the threshold as the one or more devices having a possibility of a breakdown.

3. The diagnostic method according to claim 1, wherein the acceleration information is a direction vector based on the given coordinate system, and
the calculating by the processor includes calculating the acceleration components each corresponding to the respective one of the plurality of directions by calculating inner products of the direction vector and a unit vector of each of the plurality of directions.

4. The diagnostic method according to claim 3, wherein the plurality of directions include a first direction, a second direction which is different from the first direction and a third direction obtained by synthesis of the first direction and the second direction.

5. The diagnostic method according to claim 1, wherein the thresholds included in the threshold information stored in the memory are each a maximum acceleration component among the plurality of acceleration components acquired in a case in which the information processing device is caused to fall a plurality of times and a breakdown of the plurality of devices does not occur.

6. The diagnostic method according to claim 1, wherein the receiving by the processor includes receiving the acceleration information from the acceleration sensor at a given time interval by polling.

7. The diagnostic method according to claim 1, wherein the executing a diagnosis by the processor includes executing a diagnosis when the information processing device is in a still state.

8. The diagnostic method according to claim 1, wherein the information processing device includes a display, and the diagnostic method further includes displaying by the processor, on the display, a result of the diagnosis including a device from which abnormality is detected among the selected one or more devices.

9. An information processing device, comprising:
a plurality of devices;
a memory that stores therein threshold information that is set for each of the plurality of devices, the threshold information including a plurality of directions and thresholds of acceleration components each corresponding to a respective one of the plurality of directions, the plurality of directions being associated with each of the devices and defined by a given coordinate system;
an acceleration sensor configured to transmit acceleration information of the information processing device when the information processing device falls or impacts an object; and
a processor coupled to the plurality of devices, the memory, and the acceleration sensor, the processor being configured to:
receive the acceleration information transmitted from the acceleration sensor;
calculate acceleration components each corresponding to a respective one of the plurality of directions from the received acceleration information;
select one or more devices having a possibility of a breakdown from among the plurality of devices by comparing each of the calculated acceleration components with a threshold of each corresponding acceleration component in each threshold information stored in the memory, wherein each of the calculated acceleration components corresponds to each acceleration component with respect to a direction of the plurality of directions; and
execute a diagnosis regarding the selected one or more devices.

10. A non-transitory computer-readable storage medium storing a program that causes a processor and an acceleration sensor included in an information processing device to execute a process, the information processing device including a memory and a plurality of devices which are different from the acceleration sensor, the information processing device having a function of executing a diagnosis of whether a breakdown is involved regarding each of the plurality of devices, the memory storing therein threshold information that is set for each of the plurality of devices, and the threshold information including a plurality of directions and thresholds of acceleration components each corresponding to a respective one of the plurality of directions, the plurality of directions being associated with each of the devices and defined by a given coordinate system, the process comprising:
transmitting, by the acceleration sensor, acceleration information of the information processing device when the information processing device falls or impacts an object;
receiving, by the processor, the acceleration information transmitted from the acceleration sensor;
calculating acceleration components each corresponding to a respective one of a plurality of directions from the received acceleration information;
selecting one or more devices having a possibility of a breakdown from among the plurality of devices by comparing each of the calculated acceleration components with a threshold of each corresponding acceleration component in each threshold information stored in the memory, wherein each of the calculated acceleration components corresponds to each acceleration component with respect to a direction of the plurality of directions; and
executing a diagnosis regarding the selected one or more devices.

* * * * *